United States Patent
Mizuno et al.

(10) Patent No.: US 7,972,400 B2
(45) Date of Patent: Jul. 5, 2011

(54) HONEYCOMB FILTER SYSTEM

(75) Inventors: Yukio Mizuno, Komaki (JP); Naomi Noda, Ichinomiya (JP); Toshio Yamada, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 285 days.

(21) Appl. No.: 12/098,723

(22) Filed: Apr. 7, 2008

(65) Prior Publication Data

US 2008/0264010 A1 Oct. 30, 2008

(30) Foreign Application Priority Data

Apr. 27, 2007 (JP) ................................. 2007-119207

(51) Int. Cl.
*B01D 39/06* (2006.01)
(52) U.S. Cl. ......... 55/482; 55/523; 55/DIG. 30; 60/311; 422/177
(58) Field of Classification Search .................... 55/523, 55/DIG. 30, 482; 422/180, 177; 502/304; 60/311
See application file for complete search history.

(56) References Cited

U.S. PATENT DOCUMENTS

| | | | | |
|---|---|---|---|---|
| 6,716,512 B2 * | 4/2004 | Yamamoto et al. | ........... | 428/116 |
| 6,890,616 B2 * | 5/2005 | Suwabe et al. | ................ | 428/117 |
| 7,041,358 B2 * | 5/2006 | Noda et al. | .................... | 428/116 |
| 2004/0033175 A1 * | 2/2004 | Ohno et al. | ................... | 422/180 |
| 2004/0053781 A1 * | 3/2004 | Okawara | ....................... | 502/304 |
| 2004/0161373 A1 * | 8/2004 | Ichikawa et al. | .............. | 422/180 |
| 2005/0076627 A1 * | 4/2005 | Itou et al. | ....................... | 55/523 |
| 2005/0102987 A1 * | 5/2005 | Kudo | ............................... | 55/523 |
| 2005/0129952 A1 * | 6/2005 | Sawada et al. | ............... | 428/409 |
| 2005/0180898 A1 * | 8/2005 | Yamada | ....................... | 422/180 |
| 2005/0247038 A1 * | 11/2005 | Takahashi | ....................... | 55/523 |
| 2007/0039295 A1 * | 2/2007 | Ohno | .............................. | 55/482 |
| 2007/0234694 A1 * | 10/2007 | Miyairi et al. | ................. | 55/523 |

FOREIGN PATENT DOCUMENTS

| | | |
|---|---|---|
| DE | 10 2005 027 784 A1 | 12/2006 |
| EP | 1 666 118 A1 | 6/2006 |
| JP | A 2006-7148 | 1/2006 |

OTHER PUBLICATIONS

Apr. 19, 2011 Extended European Search Report issued in European Application No. 08251409.2, 2011.

* cited by examiner

*Primary Examiner* — Duane Smith
*Assistant Examiner* — Thomas McKenzie
(74) *Attorney, Agent, or Firm* — Oliff & Berridge, PLC

(57) ABSTRACT

A honeycomb filter system comprising a first honeycomb filter disposed upstream: first filter having partition wall matrix of a mean pore diameter of 25 μm or more and below 70 μm and a porosity of 40% or more and below 70%, and carrying an oxidation catalyst containing at least one material selected from the group consisting of platinum (Pt), palladium, ceria, and alumina in at least a part of inner surfaces of pores of the matrix; and a second honeycomb filter disposed downstream; having a surface layer of a peak pore diameter of 0.3 μm or more and below 20 μm which is equivalent to or smaller than that of its matrix, and a porosity of 60% or more and below 95% which is higher than that of the matrix; and having the other specified relations.

20 Claims, 4 Drawing Sheets

CONVENTIONAL DPF

DPF SYSTEM OF
PRESENT INVENTION

FIRST DPF         SECOND DPF

HONEYCOMB FILTER SYSTEM

BACKGROUND OF THE INVENTION AND RELATED ART STATEMENT

The present invention relates to a honeycomb filter system for trapping particulate matter in exhaust gas.

A requirement for removing particulate matter contained in exhaust gas discharged from internal combustion engines such as automobile engines, construction machinery engines, and industrial machinery stationary engines and other burning appliances from the exhaust gas has grown in light of influence on environment. In particular, regulations on removal of particulate matter discharged from diesel engines tend to be strengthened on a global basis. Because of such circumstances, a DPF (diesel particulate filter) for trapping and removing particulate matter is spotlighted.

A DPF is generally constituted of a single filter. A mode of a DPF is a honeycomb filter having porous partition walls partitioning and forming a plurality of cells functioning as fluid passages, where predetermined cells having open end portions on one side and plugged end portions on the other side and the remaining cells having plugged end portions on one side and open end portions on the other side are alternately disposed, and a catalyst is supported on the inner surfaces of the pores of the partition walls. When such a honeycomb filter is used as a DPF, fluid (exhaust gas) allowed to flow in from an end portion on one side where predetermined cells are open permeates the partition walls, flows to the remaining cell side as a permeation fluid, and further flows out from the other end portion where the remaining cells are open, and thereby particulate matter in the exhaust gas is oxidized and decomposed by a catalyst and trapped and removed by the pores. Since a filter such as the above honeycomb filter having a structure where exhaust gas permeates porous partition walls (wall-flow type filter) can have a large filtration area, such a filter can have a low filtration flow rate (partition wall permeation flow rate), low pressure loss, and good trapping efficiency of particulate matter.

A prior document having the same problem described below as the present invention is, for example, JP-A-2006-7148.

However, in a DPF where only one honeycomb filter as described above is employed, when pores are small, it is difficult to support a large amount of catalyst on the inner surfaces thereof, it is difficult for particulate matter to enter deep layers of the pores, and contact ability of the catalyst with the particulate matter is low. Therefore, there arises a problem of ineffectively oxidizing and decomposing particulate matter (sometimes referred to as PM) discharged from a diesel engine. In contrast, when a structure where pores are made large and a catalyst is supported on the inner surfaces of the pores in order to enhance contact ability of the catalyst with PM, an amount of PM passing through the enlarged pores is increased though oxidation reactivity of PM is improved, and thereby there arises a problem of deteriorating PM purification ability from a comprehensive viewpoint.

SUMMARY OF THE INVENTION

The present invention has been studied for a long period in order to solve such problems and aims to provide a means having both oxidation decomposition function and trapping function of PM and being excellent in PM purification performance.

That is, according to the present invention, there is provided a honeycomb filter system comprising a first honeycomb filter disposed upstream and a second honeycomb filter disposed downstream to be lined up in series;

wherein the first honeycomb filter is provided with a porous partition wall matrix partitioning and forming a plurality of cells functioning as fluid passages, predetermined cells each having an open end portion on one side and a plugged end portion on the other side and the remaining cells each having a plugged end portion on one side and an open end portion on the other side are alternately disposed, and the first honeycomb filter satisfies the conditions of (F1) and (F2), and the second honeycomb filter is provided with partition walls having a porous partition wall matrix partitioning and forming a plurality of cells functioning as fluid passages and a surface layer disposed on one side of the partition wall matrix, predetermined cells each having an open end portion on one side and a plugged end portion on the other side and the remaining cells each having a plugged end portion on one side and an open end portion on the other side are alternately disposed, and the first honeycomb filter satisfies the conditions of (R1) to (R5):

(F1) In the first honeycomb filter, the partition wall matrix has a mean pore diameter of 25 μm or more and below 70 μm and a porosity of 40% or more and below 70%.

(F2) In the first honeycomb filter, an oxidation catalyst containing at least one material selected from the group consisting of platinum (Pt), palladium, ceria, and alumina is supported on a part or whole of the inner surfaces of the pores of the partition wall matrix.

(R1) In the second honeycomb filter, the surface layer has a peak pore diameter equivalent to or smaller than that of the partition wall matrix and a porosity higher than that of the partition wall matrix.

(R2) In the second honeycomb filter, the surface layer has a peak pore diameter of 0.3 μm or more and below 20 μm and a porosity of 60% or more and below 95% (measured by mercury intrusion technique).

(R3) In the second honeycomb filter, thickness L1 of the surface layer is 0.5% or more and below 30% of thickness L2 of the partition wall.

(R4) In the second honeycomb filter, a mass per filtering area of the surface layer is 0.01 mg/cm$^2$ or more and below 6 mg/cm$^2$.

(R5) In the second honeycomb filter, the partition wall matrix has a mean pore diameter of 10 μm or more and below 60 μm and a porosity of 40% or more and below 65%.

The inner surfaces of the pores of the partition wall matrix means surfaces in contact with the pores mainly inside the partition wall matrix (which is substantial portion) forming pores (which is spatial portion). The oxidation catalyst may also be supported on the surfaces of the partition wall matrix forming the cells.

In general, a matrix is referred to on the premise that another member is present. However, in the present specification, as it can easily be understood in comparison with the second honeycomb filter, the word "partition wall matrix" is used even in the first honeycomb filter having no surface layer. That is, the partition wall matrix corresponds to the partition walls in the first honeycomb filter, and the partition wall matrix and the surface layer correspond to the partition walls in the second honeycomb filter. Further, the upstream side and the downstream side mean the upstream side and the downstream side when fluid flows, respectively.

In the honeycomb filter system of the present invention, it is preferable that thickness L1 of the surface layer is smaller in the central portion than that in the portion near the one end portion and the other end portion in a distribution in a direction linking the one end portion and the other end portion. In this mode, the thickness L1 of the surface layer means an average value, and it goes without saying that the above (R3) condition is satisfied also in this case.

In the honeycomb filter system of the present invention, it is preferable that the surface layer of the second honeycomb filter has a peak pore diameter of 6 µm or more and below 10 µm and a porosity of 80% or more and below 95%.

In the honeycomb filter system of the present invention, it is preferable that, in the second honeycomb filter, thickness L1 of the surface layer is 3% or more and below 15% of thickness L2 of the partition wall.

In the honeycomb filter system of the present invention, it is preferable that, in the second honeycomb filter, the partition wall matrix has a mean pore diameter of 40 µm or more and below 60 µm and a porosity of 40% or more and below 60%.

In the honeycomb filter system of the present invention, it is preferable that, in the second honeycomb filter, the partition wall matrix is constituted of at least one material selected from the group consisting of cordierite, Si-bonded SiC, recrystallized SiC, alumina titanate, mullite, silicon nitride, sialon, zirconium phosphate, zirconia, titania, alumina, and silica as a main component. Incidentally, these materials are suitable also as the main material constituting the partition wall matrix of the first honeycomb filter.

In the honeycomb filter system of the present invention, the first honeycomb filter and the second honeycomb filter are provided with plugging portions to plug cells. As the material for plugging portions, there can be employed at least one kind of material selected from the materials listed above as the materials for the partition wall matrix.

In the honeycomb filter system of the present invention, it is preferable that, in the second honeycomb filter, the surface layer contains ceramic or metal fibers in an amount of 70% by mass or more. In this case, in the second honeycomb filter, the fibers are preferably constituted of at least one material selected from the group consisting of aluminosilicate, alumina, silica, zirconia, ceria, and mullite as a main component. In addition, in the second honeycomb filter, the fibers preferably have a mean diameter of 0.5 µm or more and below 8 µm and a mean length of 100 µm or more and below 500 µm. Further, in the second honeycomb filter, the fibers are preferably bio-soluble fibers.

In the honeycomb filter system of the present invention, it is preferable that a catalyst containing one of or both platinum (Pt) and palladium is(are) supported on the surface layer of the second honeycomb filter. In this case, it is further preferable that an oxide or the like having oxygen storage capacity such as ceria or zirconia as a promoter is supported thereon.

The honeycomb filter system of the present invention exhibits the following effects by being used as a DPF. The honeycomb filter system of the present invention has the first honeycomb filter disposed upstream and the second honeycomb filter disposed downstream to be lined up in series. The first honeycomb filter is provided with a porous partition wall matrix, (F1) the partition wall matrix has a mean pore diameter of 25 µm or more and below 70 µm and a porosity of 40% or more and below 70%, (F2) an oxidation catalyst containing at least one material selected from the group consisting of platinum (Pt), palladium, ceria, and alumina is supported on a part or whole of the inner surfaces of the pores of the partition wall matrix, the second honeycomb filter is provided with partition walls having a porous partition wall matrix and a surface layer provided on one side of the partition wall matrix, (R1) the surface layer has a peak pore diameter equivalent to or smaller than that of the partition wall matrix and a porosity higher than that of the partition wall matrix, (R2) the surface layer has a peak pore diameter of 0.3 µm or more and below 20 µm and a porosity of 60% or more and below 95% (measured by mercury intrusion technique), (R3) thickness L1 of the surface layer is 0.5% or more and below 30% of thickness L2 of the partition wall, (R4) a mass per filtration area of the surface layer is 0.01 mg/cm$^2$ or more and below 6 mg/cm$^2$, (R5) the partition wall matrix has a mean pore diameter of 10 µm or more and below 60 µm and a porosity of 40% or more and below 65%. Therefore, in the first honeycomb filter on the upstream side, trapping and oxidation of a part of PM and oxidation of NO (nitrogen monoxide) into $NO_2$ (nitrogen dioxide) can be performed, and, in the second honeycomb filter on the downstream side, PM leaking from the first filter can be trapped at a high efficiency with oxidizing PM by $NO_2$ flowing in from upstream. That is, according to the honeycomb filter system of the present invention, PM can effectively be oxidized and decomposed, and PM is trapped without passing through the system, which enables to realize high PM purification efficiency.

REFERENCE NUMERALS

Figure 1:
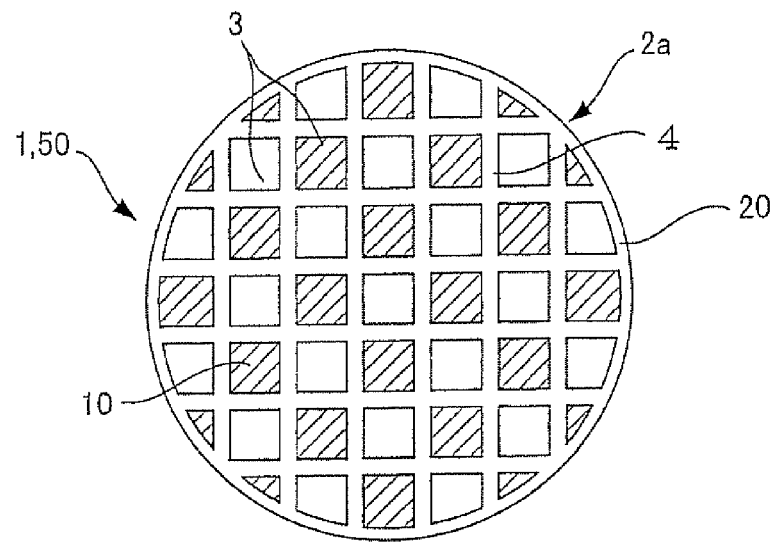
FIG. 1 is a view schematically showing an embodiment of the honeycomb filter system of the present invention, which is a front view of the first honeycomb filter constituting the honeycomb filter system.

1: first honeycomb filter, 2a, 2b: end face, 3: cell, 4: partition wall matrix, 7: particulate matter (PM), 10: plugging portion, 20: outer peripheral wall, 50: honeycomb structure, 100: honeycomb filter system, 101: second honeycomb filter, 102a, 102b: end face, 104: partition wall matrix, 114: partition wall, 124: surface layer, 150: honeycomb structure

DETAILED DESCRIPTION OF THE INVENTION

Embodiments of the present invention will hereinbelow be described with conveniently referring to drawings. However, the present invention should not be construed as limited to the embodiments. Various kinds of changes, modifications, improvements, and replacements may be added thereto on the basis of knowledge of a person of ordinary skill within the range of not deviating from the gist of the present invention. For example, the drawings show suitable embodiments of the present invention. However, the present invention is not limited by the modes shown in the drawings or information shown in the drawings. When the present invention is carried out or verified, a means same as or equivalent to that described in the present specification can be employed. However, a suitable means is the means described below.

Figure 2:
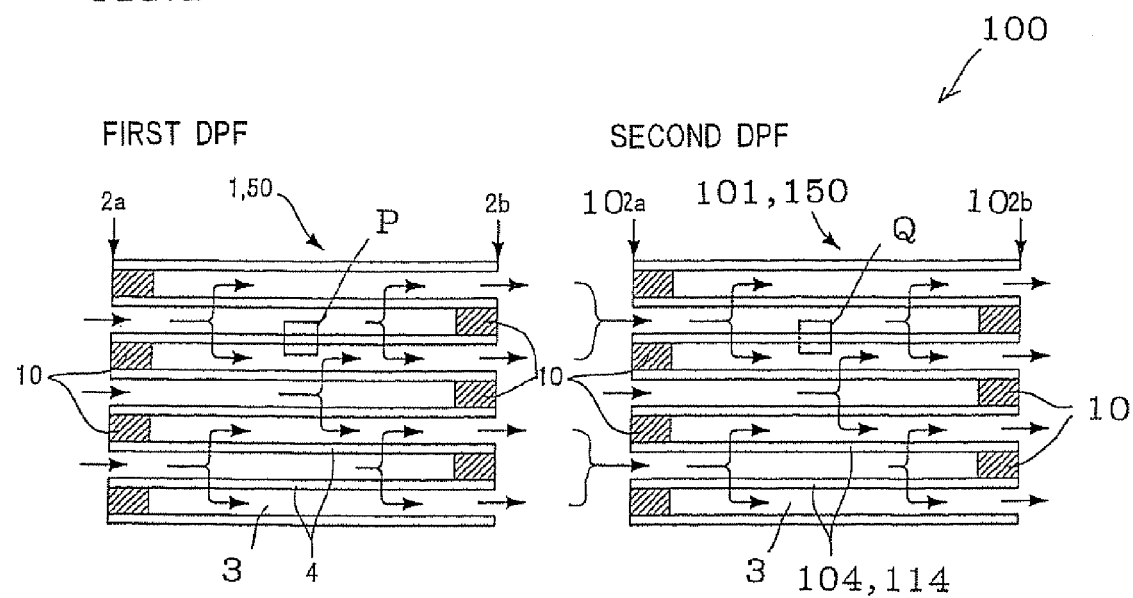
FIG. 2 is a view schematically showing an embodiment of the honeycomb filter system of the present invention, which is a cross-sectional view of the first honeycomb filter and the second honeycomb filter constituting the honeycomb filter system.
Figure 3:
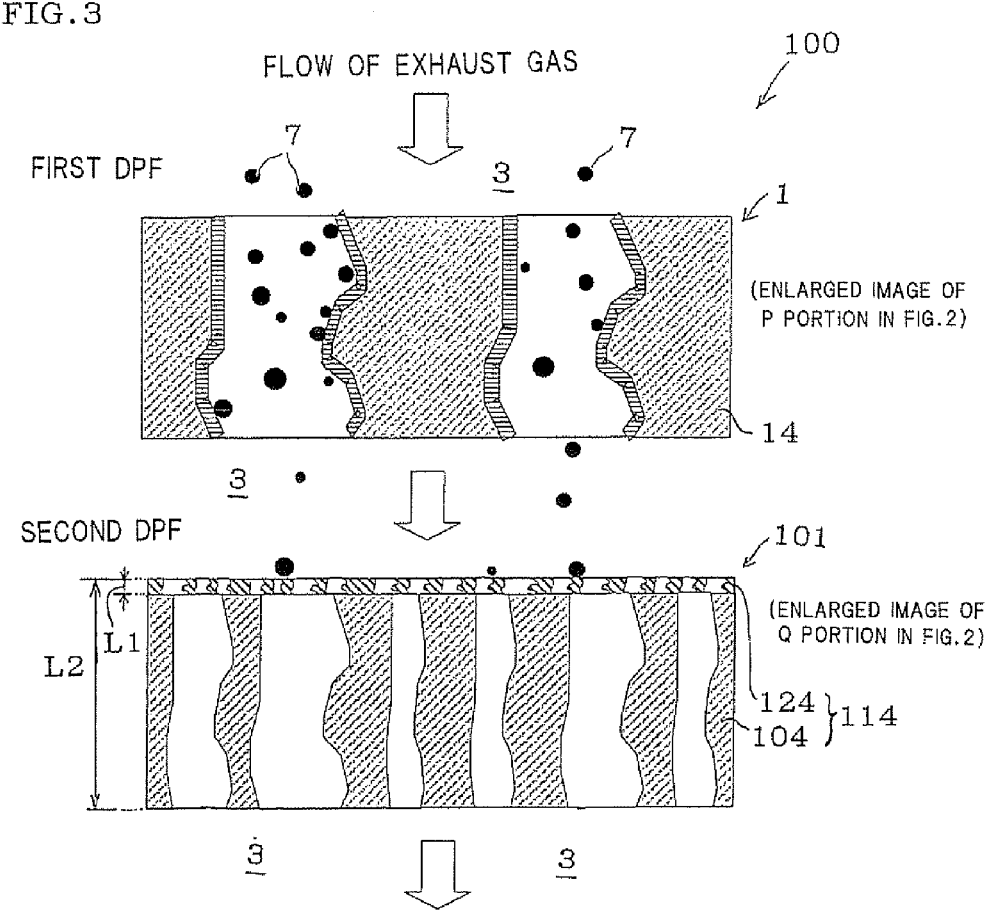
FIG. 3 is a partial cross-sectional view showing enlarged P portion and Q portion in FIG. 2 and omitting the other portions.

FIG. 1 is a view schematically showing an embodiment of the honeycomb filter system of the present invention, which is a front view of the first honeycomb filter constituting the honeycomb filter system. Though a front view of the second honeycomb filter is omitted, it is similar to that of FIG. 1. FIG. 2 is a view schematically showing an embodiment of the honeycomb filter system of the present invention, which is a cross-sectional view of the first honeycomb filter and the second honeycomb filter constituting the honeycomb filter system. FIG. 3 is a partial cross-sectional view showing enlarged P portion and Q portion in FIG. 2 and omitting the other portions. In FIG. 2, a surface layer is omitted.

Figure 7:
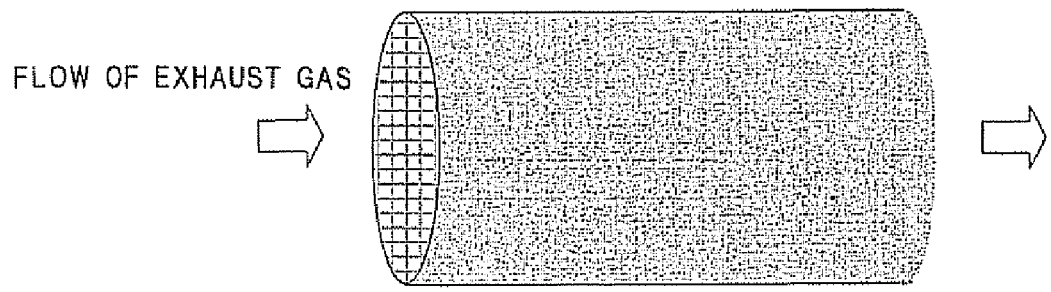
FIG. 7 is a view showing an embodiment of the honeycomb filter system of the present invention, which is a perspective view in comparison with a conventional example.
Figure 7:
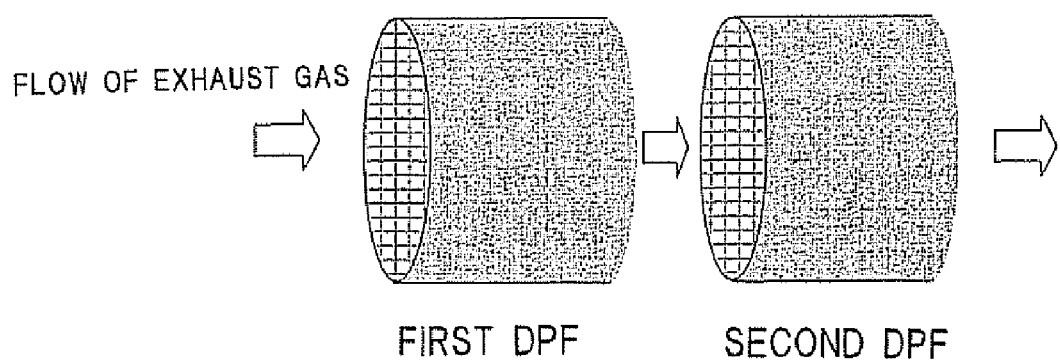

FIG. 7 is a view showing an embodiment of a honeycomb filter system of the present invention, which is a perspective view of an example where the honeycomb filter system is used as a DPF in comparison with a conventional example. As shown in FIG. 7, the honeycomb filter system of the present invention is characterized in that a DPF system where two honeycomb filters are employed as DPFs playing different roles can be built up in place of a conventional DPF constituted of a single filter. The first DPF (honeycomb filter) and the second DPF (honeycomb filter) are disposed in series to be connected to each other. Exhaust gas is treated at the first DPF (honeycomb filter), then treated at the second DPF (honeycomb filter), and discharged outside the system.

A honeycomb filter system 100 shown in FIGS. 1 to 3, which is used as a DPF system, is constituted of the first honeycomb filter 1 and the second honeycomb filter 101. The first honeycomb filter 1 has, as the main constituent, a honeycomb structure 50 provided with a porous partition wall matrix 4 partitioning and forming a plurality of cells 3 functioning as fluid passages in the portion surrounded by the outer peripheral wall 20. In the honeycomb structure 50, plugging portions 10 for plugging end portions of the cells 3 are formed, and an oxidization catalyst containing at least one material selected from the group consisting of platinum (Pt), palladium, ceria, and alumina is supported on a part or whole of the inner surfaces of the pores of the partition wall matrix 4 to form the first honeycomb filter 1.

The partition wall matrix of the first honeycomb filter 1 has a mean pore diameter of 25 µm or more and below 70 µm and a porosity of 40% or more and below 70%. Incidentally, in the present specification, the mean pore diameter of the partition wall matrix was obtained by mercury intrusion technique.

In the first honeycomb filter 1, upon use, exhaust gas (fluid) flows into cells 3 from an end face 2a on one side (from an end portion on one side where predetermined cells 3 are open (end portion on the end face 2a side)), passes through the partition wall matrix 4 functioning as a filtration layer provided with a catalyst, flows into the cells (remaining cells 3) which are open on the other end face 2b side as a permeation fluid, flows out from the other end face 102b side (the end portions on the other side of the remaining cells 3 (end portions on the end face 102b side)), and flows into the second honeycomb filter 101 in a subsequent stage. When the exhaust gas passes through the partition wall matrix 4, a part of PM contained in the exhaust gas is trapped by the partition wall matrix 4 and brought into contact with an oxidation catalyst to be oxidized. In addition, NO contained in the exhaust gas is oxidized to give $NO_2$.

Hereinbelow, explanation of the first honeycomb filter 1 will be continued. This falls under the second honeycomb filter similarly. Therefore, the following explanation will be omitted in the explanation of the second honeycomb filter described later.

In the first honeycomb filer 1, the partition wall matrix 4 is disposed in such a manner that a plurality of cells 3 communicating between two end faces 2a and 2b are formed, and the plugging portions 10 are disposed in such a manner that the cells 3 are plugged in one of the end faces 2a and 2b. The plugging portions 10 are present in such a manner that the adjacent cells 3 are plugged alternately in the opposite end portions (end portion on either one of the end faces 2a and 2b). As a result, as shown in FIG. 1, each of the end faces of the first honeycomb filter 1 (honeycomb structure 50) shows a checkerwise pattern.

The outer peripheral wall 20 (see FIG. 1) located in the outermost periphery of the first honeycomb filter 1 may be a unitarily formed wall which is formed unitarily with a portion constituted of the partition wall matrix 14 upon manufacturing (forming) or may be a cement-coated wall formed by grinding the outer periphery of a portion constituted of the partition wall matrix 14 after forming to obtain a predetermined shape and then forming an outer peripheral wall with cement or the like. It is shown that, in the first honeycomb filter 1, the plugging portions 10 are disposed so as to plug cells 3 on end faces 2a and 2b. However, plugging portion-disposed conditions of the first honeycomb filter is not limited to such a condition, and plugging portions may be disposed inside the cells. It is also possible to employ a mode where some of the cells have no plugging portion giving priority to reduction in pressure loss over filtration performance.

The first honeycomb filter 1 preferably has a cell 3 density (cell density) of 15 cells/cm$^2$ or more and below 65 cells/cm$^2$ and a partition wall matrix 4 thickness of 200 µm or more and below 600 µm. Since the pressure loss upon PM accumulation is reduced as the filtration area increases, higher cell density reduces more pressure loss upon PM accumulation. On the other hand, since initial pressure loss is reduced by decreasing a hydraulic diameter of the cells, lower cell density is better from this viewpoint. When the partition wall matrix 4 thickness increases, initial pressure loss increases though the trapping efficiency enhances. In consideration of initial pressure loss, pressure loss upon PM accumulation, and trapping efficiency tradeoff, the aforementioned ranges of cell density and partition wall thickness satisfy all the conditions.

The thermal expansion coefficient of the first honeycomb filter 1 (honeycomb structure 50) in the communicating direction of the cells 3 at 40 to 800° C. is preferably below $1.0 \times 10^{-6}$, more preferably below $0.8 \times 10^{-6}$, and particularly preferably below $0.5 \times 10^{-6}$. This is because, when the thermal expansion coefficient is below $1.0 \times 10^{-6}$ in the communicating direction of the cells at 40 to 800° C., the generating thermal stress when the honeycomb filter 1 is exposed to high temperature exhaust gas can be suppressed within an allowable range, and damages due to thermal stress can be avoided.

As shown in FIGS. 1 and 2, the first honeycomb filter 1 has a columnar (cylindrical) shape as a whole, and the shape of the cells 3 (a cross-sectional shape cut along a face perpendicular to the communicating direction of the cells 3 in the diametrical direction of the first honeycomb filter) is square. However, in the first honeycomb filter 1, the whole shape and the shape of the cells are not particularly limited. For example, the whole shape may be an oval column, an elliptic column, a quadrangular prism, a triangular prism, or other polygonal prisms, and the cell shape may be hexagonal, triangle, or the like.

The first honeycomb filter 1 has been explained regarding so far the points in common with those of the second honeycomb filter. Next, the second honeycomb filter 101 will be explained. In the second honeycomb filter 101 of the honeycomb filter system 100 shown in FIGS. 1 to 3 has, as the main constituent, a honeycomb structure 150 provided with the porous partition wall matrix 104 partitioning and forming a plurality of cells 3 functioning as fluid passages in the portion surrounded by the outer peripheral wall like the first honeycomb filter 1. In the honeycomb structure 150, the plugging portions 10 for plugging end portions of cells 3 are formed, and the surface layer 124 is provided as well on one side of the partition wall matrix 104 to obtain the second honeycomb filter 101. That is, in the second honeycomb filter 101, the partition wall matrix 104 and the surface layer 124 constitute the partition wall 114 (see FIG. 3).

Figure 4:
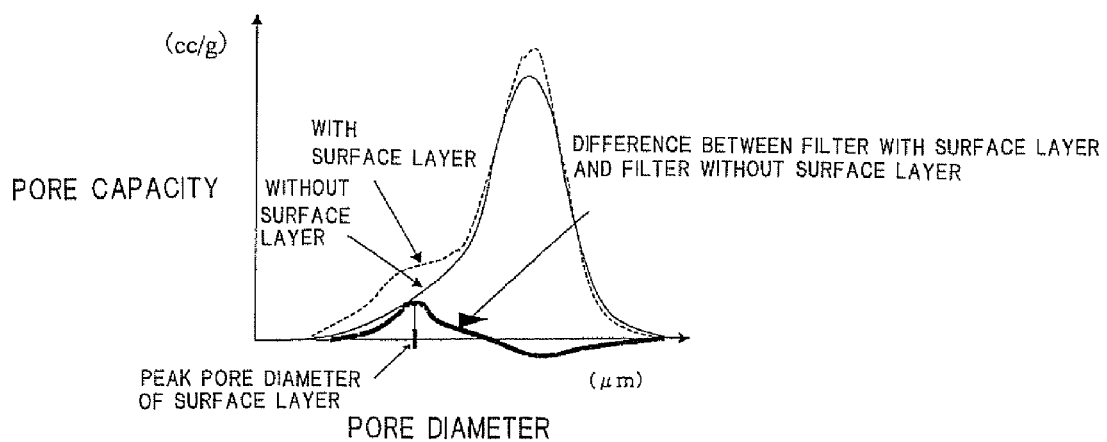
FIG. 4 is a view showing an embodiment of the honeycomb filter system of the present invention, which is a graph showing a pore distribution of the second honeycomb filter constituting the honeycomb filter system.

In the second honeycomb filter 101, the surface layer 124 has a peak pore diameter equivalent to or smaller than that of the partition wall matrix 104. The peak pore diameter means a pore diameter constituting the peak of the pore distribution. In the present specification, a pore distribution of pores of the partition wall matrix is shown by a value measured by mercury intrusion technique. In the present specification, the pore distribution, the mean pore diameter, and the pore diameter can be measured using, for example, Porosimeter 9810 produced by Shimadzu Corporation. FIG. 4 is a graph showing a pore distribution obtained by mercury intrusion technique, showing a correlation between pore capacity and pore diameter. In the present specification, a peak pore diameter of the surface layer is determined by a peak of the pore distribution of the surface layer by regarding the difference between a result of measuring a pore distribution of partition walls (with a surface layer (having a surface layer)) and a result of measuring a pore distribution of the filter from which a surface layer excluding a transition layer (interface between the surface layer and the partition wall matrix) is removed as the pore distribution of the surface layer (see FIG. 4).

Figure 5:
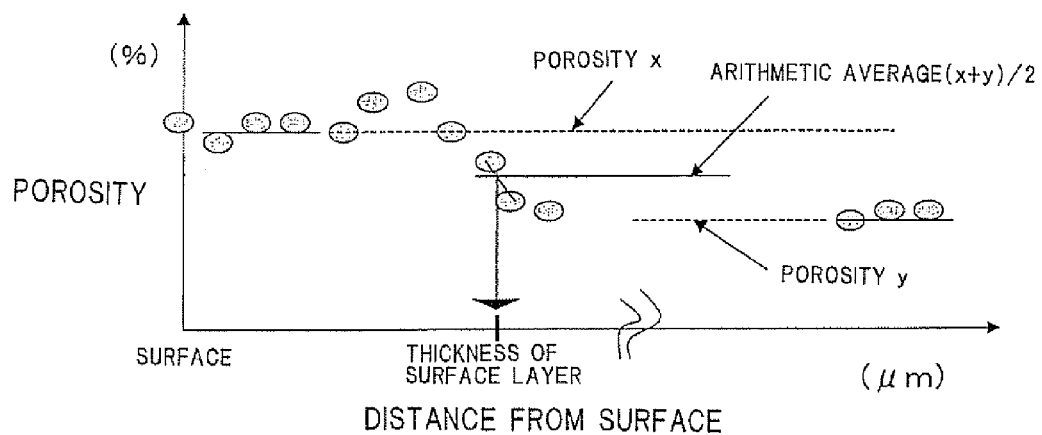
FIG. 5 is a view showing an embodiment of the honeycomb filter system of the present invention, which is a graph showing a correlation between distance from the surfaces of the partition walls and porosity in the second honeycomb filter constituting the honeycomb filter system.

In the second honeycomb filter 101, thickness L1 of the surface layer 124 is 0.5% or more and below 30% of thickness L2 of the partition wall 114 (see FIG. 3). In the present specification, thickness of the surface layer can be obtained by image analysis of a cross section of a partition wall through an SEM (scanning electron microscope) (see FIG. 5). FIG. 5 is a graph showing a correlation between distance from the surfaces of the partition walls and porosity in the second honeycomb filter. To obtain thickness of a surface layer, a region having a half thickness of the partition wall is divided into 1000 or more in the thickness direction in the first place, porosity in a square in each of the regions divided above is measured from the region closest to the surface as a space/solid area ratio on the image and plotted with respect to the distance from the surface. Incidentally, an average value of 20 visions in each distance is plotted. Then, the average of three points close to the surface excluding the point closest to the surface is obtained as a porosity of the surface layer (referred to as porosity x). On the other hand, the average space/solid area ratio of 20 square visions (a side of the square is 1/1000 of thickness of a partition wall) is measured at the position fully apart from the surface (central portion in the thickness direction of the partition wall), and the average space/solid area is determined as porosity of the partition wall matrix (referred to as porosity y). Then, a position (distance from the surface) where the straight line due to arithmetic average of the porosity x and the porosity y and the straight line connecting the plots intersect is defined as thickness (depth) of the surface layer.

In the second honeycomb filter 101, the mean pore diameter of the partition wall matrix 104 is 10 μm or more and below 60 μm. The mean pore diameter of the partition wall matrix 104 can be obtained by cutting out a piece of a partition wall, removing a surface layer by grinding, and measuring the remaining portion (corresponding to the partition wall matrix).

In the second honeycomb filter 101, the porosity of the surface layer 124 is higher than the porosity of the partition wall matrix 104. In the specification, porosity is a value measured by a water immersion method and shown by volume % (simply referred to as % in the present specification). The porosity of the partition wall matrix can be obtained by cutting out a piece of a partition wall, removing a surface layer, and measuring the remaining portion (corresponding to the partition wall matrix).

In the second honeycomb filter 101, when it is used, exhaust gas (fluid) passed through (treated in) the first honeycomb filter 1 flows into the cells 3 from the end face 102a side (an end portion on one side where predetermined cells 3 are open (an end portion on the end face 102a side)), passes through the partition walls 104 functioning as a filtration layer from the side where the surface layer 124 is provided, and flows out to the cells 3 (remaining cells 3) which are open on the end face 102b side as a permeation fluid. Then, the fluid flows outside the second honeycomb filter 101 (outside the honeycomb filter system 100) from the other end face 102b side (the other end portion (end portion on the end face 102b side) of the remaining cells 3). PM which is not trapped by the first honeycomb filter 1 is trapped by the partition walls 114 when the exhaust gas passes through the partition walls 114, $NO_2$ generated by oxidation of NO in the first honeycomb filter 1 flows into the second honeycomb filter 101, and PM is brought into contact with the $NO_2$ to be oxidized and decomposed.

Next, a method for manufacturing the honeycomb filter system of the present invention will be described. The honeycomb filter system of the present invention can be obtained by manufacturing the first honeycomb filter and the second honeycomb filter and disposing them in series in, for example, a metal container. More specifically, the first honeycomb filter is disposed on the upstream side, and the second honeycomb filter is disposed on the downstream side. They are disposed in a metal container in such a manner that the exhaust gas flows into the first honeycomb filter in the first place, and then exhaust gas treated in the first honeycomb filter flows into the second honeycomb filter.

In order to obtain the first honeycomb filter 1 and the second honeycomb filter 101, honeycomb structures 50 and 150 are manufactured in advance as fired bodies. The honeycomb structures (honeycomb structures 50 and 150) are preferably subjected to plugging by the plugging portions 10 in end portions of cells 3 before a catalyst is supported or before the surface layer is provided to obtain plugged honeycomb structures. A means to obtain the honeycomb structures (plugged honeycomb structures) is not limited. The honeycomb structures can be manufactured by, for example, the following method.

First, a raw material described previously as a material for the partition wall matrix is selected, mixed, and kneaded to obtain clay. For example, when cordierite is employed as material for the partition wall matrix, a dispersion medium such as water and a pore former are added to a cordierite-forming raw material, and further an organic binder and a dispersant are added thereto, followed by kneading to form clay. A means to prepare clay by kneading a cordierite-forming raw material (forming raw material) is not particularly limited, and a method using, for example, a kneader, a vacuum pug mill, or the like may be employed.

The cordierite-forming material means a raw material which becomes cordierite after firing and ceramic raw material having a compounding ratio capable of giving a chemical composition of 42 to 56 mass % of silica, 30 to 45 mass % of alumina, and 12 to 16 mass % of magnesia. Specific examples include a raw material in which a plurality of inorganic materials selected from the group consisting of talc, kaolin, calcined kaolin, alumina, aluminum hydroxide, and silica are contained at a ratio giving the above chemical composition. Any pore former may be employed as long as it disperses and disappears in the firing step, and an inorganic substance such as coke, polymer compound such as foaming resin, and an organic substance such as starch can be employed alone or in combination. Examples of the organic binder include hydroxypropylmethyl cellulose, methyl cellulose, hydroxyethyl cellulose, carboxymethyl cellulose, and polyvinylalcohol. These may be used alone or in combination of two kinds or more. Examples of the dispersant include ethylene glycol, dextrin, fatty acid soap, and polyalcohol. These may be employed alone or in combination of two kinds or more.

Next, the clay obtained above is formed into a honeycomb shape to manufacture a honeycomb formed body. The method for manufacturing a honeycomb formed body is not particularly limited, and a conventionally known method such as extrusion forming, injection forming, or press forming can be employed. Of these, a suitable example is a method where clay prepared as described above is subjected to extrusion forming using a die having predetermined cell shape, partition wall thickness, and cell density.

Next, for example, the both end portions of the obtained honeycomb formed body are subjected to plugging. The method for plugging is not particularly limited. For example, plugging slurry containing cordierite-forming material, water or alcohol, and an organic binder is stored in a container, and an end portion on one side of the honeycomb formed body is masked by alternately sealing cells in a checkerwise pattern. Then, the masked end portion is immersed in the plugging slurry to fill the plugging slurry into the cells without the mask to form plugging portions (plugging portions 10). With respect to the other end portion, masking is performed on the cells which were plugged above, and plugging portions are formed in the same manner as above. Thus, in the honeycomb formed body, the cells open (not plugged) in the end portion on one side are plugged on the end portion on the other side to have a structure where the cells are alternately plugged to show a checkerwise pattern in the both end portions of the honeycomb formed body.

Next, the plugged honeycomb formed body is dried to obtain a honeycomb dried body. The means for drying is not particularly limited, and a conventionally known drying method such as hot air drying, microwave drying, dielectric drying, drying under reduced pressure, vacuum drying, and freeze drying may be employed. Of these, a preferable drying method is a combination of hot air drying and microwave drying or dielectric drying in that the entire formed body can be dried quickly and uniformly.

Next, the honeycomb dried body obtained above is calcined before firing to obtain a calcined body. "Calcination" means an operation to remove organic substances (organic binder, dispersant, pore former, and the like) in the honeycomb formed body by combustion. Since, firing temperature of an organic binder is generally about 100 to 300° C., and firing temperature of a pore former is generally about 200 to 800° C., calcination temperature may suitably be about 200 to 1000° C. Though the calcination period of time is not particularly limited, it is generally about 10 to 100 hours.

Then, the calcined body obtained above is fired (main firing) to obtain a (plugged) honeycomb structure. In the present invention, the main firing means an operation to sinter the forming raw material in the calcined body for densification to secure predetermined strength. Since firing conditions (temperature, time) differ depending on the kind of the forming raw material, suitable conditions may be selected according to the kind. When cordierite raw material is fired, it is preferable to fire the material at 1410 to 1440° C. for about 3 to 10 hours.

A method for manufacturing a (plugged) honeycomb structure has been described so far. Next, the first honeycomb filter 1 can be obtained by providing an oxidation catalyst layer (supporting an oxidation catalyst) containing at least one material selected from the group consisting of platinum, palladium (noble metal), ceria, and alumina (inorganic oxide) on the surfaces of the partition wall matrix and the inner surfaces of the pores of the plugged honeycomb structure obtained above. A suitable means for arranging the oxidation catalyst layer is a method where slurry of at least one material selected from the group consisting of platinum, palladium, ceria, and alumina is prepared, the plugged honeycomb structure is dipped into the slurry to coat the surfaces of the partition walls and the inner surfaces of the pores with the slurry, and the slurry is dried at room temperature or under heating conditions. In a suitable mode of the oxidation catalyst layer, platinum or palladium is dispersed and supported on ceria and alumina particles.

After the plugged honeycomb structure is obtained, the surface layer is provided on one side of the partition wall matrix to obtain the second honeycomb filter 101. A suitable means for providing the surface layer is a method where at least one fibrous material selected from the group consisting of silica, alumina, cordierite, mullite, and glass, an adhesive material containing, as the main component, silica or alumina which is solidified by drying, an organic binder, and water or alcohol are mixed to obtain slurry; the slurry is accumulated on one side of the partition wall matrix; and then the slurry is dried, or dried and fired. When the slurry is accumulated on one side of the partition wall matrix, it is preferable that the slurry is atomized by an atomizer and sucked in from an end portion of each cell of the honeycomb structure with air.

Alternatively, the surface layer may be provided by mixing at least one fibrous material selected from the group consisting of silica, alumina, cordierite, mullite, and glass, water or alcohol to obtain slurry; further adding grease and a surfactant thereto, followed by mixing to obtain an emulsion-forming raw material; accumulating the emulsion-forming raw material on one side of the partition wall matrix; and then drying, or drying and firing the raw material.

Further, as another means for providing the surface layer, it is also possible to employ a method where colloid particles constituted of polymer organic matter removable by firing are accumulated on one side of the partition wall matrix to form a colloid particle layer, at least one fibrous material selected from the group consisting of silica, alumina, cordierite, mullite, and glass and water are mixed together to obtain slurry, the colloid particle layer is impregnated with the slurry, and the slurry is dried and fired.

The present invention will hereinbelow be described more specifically with Examples. However, the present invention is by no means limited to these Examples.

EXAMPLE 1

(Manufacture of plugged honeycomb structure) As a cordierite-forming raw material, alumina, aluminum hydroxide, kaolin, talc, and silica were used. To 100 parts by mass of the cordierite-forming raw material were added 13 parts by mass of pore former, 35 parts by mass of dispersion medium, 6 parts by mass of organic binder, and 0.5 part by mass of dispersant, and they were mixed together and kneaded to prepare clay. Water was used as the dispersion medium, and, coke having an average particle diameter of 10 µm was used as the pore former. Hydroxypropylmethyl cellulose was used as the organic binder, and ethylene glycol was used as the dispersant. Then, the clay was subjected to extrusion forming using a predetermined die to obtain a honeycomb formed body having a square cell shape and a columnar (cylindrical) entire shape. The honeycomb formed body was dried with a microwave drier and completely dried with a hot air drier. Then, both of the end faces of the honeycomb formed body were cut to obtain predetermined dimensions. Next, opening portions of cells in an end face on one side of the honeycomb formed body were masked alternately to show a checkerwise pattern. The masked side end portion was immersed in the plugging slurry containing the cordierite-forming raw material to form plugging portions alternately arranged in a checkerwise pattern. In the end portion on the other side, cells plugged in the end portion on one side as described above were masked, and plugging portions were formed in the same manner as the above plugging method. Then, the honeycomb formed body having plugging portions was dried with a hot air drier and further fired at 1410 to 1440° C. for 5 hours to obtain the plugged honeycomb structure for the first honeycomb filter and the second honeycomb filter.

(Formation of oxidation catalyst layer) To 1000 g of $Al_2O_3$ power, 120 g of Pt was added as an aqueous solution of nitrate, and further 2000 g of water was added. Wet grinding was performed to obtain slurry for forming an oxidation catalyst layer. The plugged honeycomb structure obtained above was dipped into the slurry to coat the surfaces of the partition walls forming the cells and the inner surfaces of the pores of the partition walls with the slurry. The coating was repeated until the amount of supported Pt reached 2 g/L per honeycomb capacity. Then, drying was performed at 600° C. for 3 hours to obtain the first honeycomb filter obtained by providing the oxidation catalyst layer on the plugged honeycomb structure.

(Formation of Surface Layer)

Aminosilicate fiber having a mean diameter of 3 µm and a mean length of 105 µm as the fibrous material, silica having an average particle diameter of 1 µm as the bonding material, and cellulose as the organic binder were used at a mass ratio of 90:10:5 to obtain 100 g by mass as a whole, which was mixed with 5 liters of water to obtain slurry for forming a surface layer. Then, the slurry was introduced into a needle-shaped atomizer having a nozzle hole diameter of 1.5 mm and atomized under an air pressure of 0.15 MPa to be accumulated on one side of the partition wall matrix of the plugged honeycomb structure obtained above. Then, the slurry was dried at 130° C. for one hour and then fired at 700° C. for one hour to obtain the second honeycomb filter having the surface layer on the plugged honeycomb structure.

(Single evaluation of second honeycomb filter) The second honeycomb filter obtained above had a columnar (cylindrical) shape having a diameter of 144 mm and a length of 152 mm. The second honeycomb filter (honeycomb filter No. 1) was measured by a method described below, for surface layer thickness L1, partition wall thickness L2, peak pore diameter of the surface layer, porosity of the surface layer, the mean pore diameter of the partition wall matrix, porosity of the partition wall matrix, thickness and mass of the surface layer at each position on the inlet side, the center, and the outlet side. The second honeycomb filter was evaluated alone by initial trapping efficiency, pressure loss when PM accumulates, increase rate in pressure loss, and hysteresis characteristics. The results are shown in Table 1 with a means for forming the surface layer, cell density, ratio of surface layer thickness L1 to partition wall thickness L2, fiber content of the surface layer, mean diameter and mean length of fibers of the surface layer, and comprehensive evaluation. Incidentally, the comprehensive evaluation was given as good (described later) for the honeycomb filters having good evaluations for all of initial trapping efficiency, pressure loss when PM accumulates, increase in pressure loss, and hysteresis characteristics, and as bad for the other honeycomb filters. The mean pore diameter, pore distribution, and porosity were measured using Porosimeter 9810 produced by Shimadzu Corporation. The position on the inlet side for measuring thickness and mass of the second honeycomb filter means the site of 20 mm from the end face on the side where exhaust gas flows in. The position on the outlet side means the site of 20 mm from the end face of the second honeycomb filter on the side where exhaust gas flows out. The central position means the intermediate point between the both end faces (intermediate point in the axial direction) of the columnar second honeycomb filter. The surface layer thickness L1 is an average thickness of the surface layer measured at 10 sites in total including the each position on the inlet side, the center, and the outlet side.

TABLE 1(a)

| Honeycomb filter No. | Cell density (cells/cm²) | Partition wall thickness L2 (µm) | Surface layer thickness L1 (µm) | L1/L2 (%) | Peak pore diameter of surface layer (µm) | Porosity of surface layer (%) | Fiber content of surface layer (mass %) | Fiber of surface layer Mean diameter (µm) | Fiber of surface layer Mean length (µm) | Mean pore diameter of partition wall matrix (µm) | Porosity of partition wall matrix (%) |
|---|---|---|---|---|---|---|---|---|---|---|---|
| No. 1 | 46.5 | 300 | 30 | 10 | 3 | 90 | 90 | 3 | 105 | 25 | 52 |
| No. 2 | 46.5 | 300 | 30 | 10 | 8 | 90 | 90 | 6 | 300 | 11 | 42 |
| No. 3 | 46.5 | 300 | 30 | 10 | 8 | 90 | 90 | 6 | 300 | 55 | 63 |

TABLE 1(b)

| Honeycomb filter No. | Surface layer thickness (μm) | | | Mass of surface layer (mg/cm²) | | | Initial trapping efficiency | | Pressure loss when PM accumulates | | Increase rate in initial pressure loss | | Hysteresis characteristics | | Comprehensive evaluation |
|---|---|---|---|---|---|---|---|---|---|---|---|---|---|---|---|
| | Position of 20 mm from end face on inlet side | Central position | Position of 20 mm from end face on outlet side | Position of 20 mm from end face on inlet side | Central position | Position of 20 mm from end face on outlet side | Evaluation | (%) | Evaluation | — | Evaluation | (%) | Evaluation | (%) | |
| No. 1 | 35 | 28 | 38 | 0.75 | 0.6 | 0.814 | Good | 99 | Good | 0.2 | Good | 3 | Good | 3 | Good |
| No. 2 | 35 | 28 | 38 | 0.75 | 0.6 | 0.814 | Good | 99 | Good | 0.2 | Good | 1.5 | Good | 3 | Good |
| No. 3 | 35 | 28 | 38 | 0.75 | 0.6 | 0.814 | Good | 99 | Good | 0.2 | Good | 1.5 | Good | 3 | Good |

[Porosity of partition wall matrix] An image of a cross section of a partition wall of the second honeycomb filter was taken through an SEM (scanning electron microscope) In a position fully apart from the surface of the partition wall (central portion in the thickness direction of the partition wall), the average space/solid area ratio of 20 square visions (a side of the square is 1/1000 of thickness of a partition wall) was measured, and this was defined as a porosity of the partition wall matrix.

[Porosity of surface layer] An image of a cross section of a partition wall of the second honeycomb filter was taken through an SEM (scanning electron microscope). From a region close to the surface of the partition wall, the average space/solid area ratio of 20 square visions (a side of the square is 1/1000 of thickness of a partition wall) in each of the divided regions was measured, and the average of three points close to the surface excluding the point closest to the surface was obtained to be defined as a porosity of the surface layer.

[Partition wall thickness] An image of a cross section of a partition wall of the second honeycomb filter was taken through an SEM, and the partition wall thickness was measured from the image.

[Surface layer thickness] An image of a cross section of a partition wall of the second honeycomb filter was taken through an SEM, a region having a half thickness of the partition wall was divided into 1000 in the thickness direction, porosity in a square in each of the divided regions was measured from the region nearest to the surface as a space/solid area ratio on the image and an average value of 20 visions in each distance was plotted with respect to the distance from the surface. Then, a distance from the surface at a position where the straight line due to arithmetic average of the porosity of the surface layer and the porosity of the partition wall matrix and the straight line connecting the plots of the above porosity intersect (in other words, distance from the surface corresponding to porosity of the above arithmetic average on the line connecting the above plots) was defined as a thickness of the surface layer.

[Mean pore diameter of the partition wall matrix] A partition wall was cut out from the second honeycomb filter. The surface layer was removed by grinding, and the remaining portion (corresponding to the partition wall matrix) was measured for the mean pore diameter, which was defined as the mean pore diameter of the partition wall matrix.

[Peak pore diameter of surface layer] A partition wall was cut out from the second honeycomb filter, and the partition wall was measured for pore distribution. Then, the surface layer was removed from the partition wall by grinding. Then, the remaining portion (corresponding to the partition wall matrix) was measured for pore distribution. The difference between the pore distribution of the partition wall and the pore distribution of the remaining portion of the partition wall without the surface layer was regarded as the pore distribution of the surface layer, and the pore diameter forming the peak in the pore distribution was defined as the peak pore diameter of the surface layer.

[Mass of the surface layer] After a partition wall was cut out and measured for mass and area, the surface layer was removed by grinding to measure the mass again. A value obtained by dividing the difference between these values of mass by the area was defined as the mass of the surface layer per surface area (filtration area).

[Initial trapping efficiency] Exhaust gas from a light oil burner was flowed into the second honeycomb filter under the conditions of PM concentration of 1 mg/m³, temperature of 200° C., and flow rate of 2.4 Nm³/min, and the number of PM particles in the upstream (before the exhaust gas flows in the second honeycomb filter) and the number of PM particles in the down stream (after the exhaust gas flows out from the second honeycomb filter) in the initial state before PM accumulated on the second honeycomb filter were measured. Then, a trapping efficiency was calculated from the formula, {(number of upstream PM particles)−(number of downstream PM particles)}/(number of upstream PM particles)× 100. The number of PM particles was measured by counting PM particles using a SMPS (Scanning Mobility Particle Sizer) produced by TSI Incorporated. The initial trapping efficiency of 80% or more was evaluated as "good", and the initial trapping efficiency of below 80% was evaluated as "bad".

[Initial Pressure Loss] Air at room temperature was flowed into the second honeycomb filter having no PM accumulated at a flow rate of 8 NM³/min. The difference in pressure between upstream and downstream of the second honeycomb filter was measured with a differential manometer to obtain the initial pressure loss (not shown in Table 1).

[Pressure loss upon PM accumulation] PM was accumulated on the second honeycomb filter having no PM accumulated thereon at a ratio of 2 g/L as a mass per capacity. Air at 200° C. was flowed into the second honeycomb filter having PM accumulated thereon at a flow rate of 2.4 Nm³/min. The difference in pressure between upstream and downstream of the second honeycomb filter was measured with a differential manometer to obtain the pressure loss upon PM accumulation (referred to as pressure loss A, see FIG. 6 described later). The pressure loss upon PM accumulation shown in Table 1 is shown by a relative value regarding the result of Comparative Example 1 as 1. The pressure loss upon PM accumulation was evaluated as "good" for below 0.5 and "bad" for 0.5 or more.

[Initial pressure loss increase rate] Based on the initial pressure loss and the pressure loss upon PM accumulation of the second honeycomb filter described above, the initial pressure loss increase rate was calculated by the formula, {(pressure loss upon PM accumulation)−(initial pressure loss)}/(initial pressure loss)×100. The initial pressure loss increase rate was evaluated as "good" for below 10% and "bad" for 10% or more.

Figure 6:
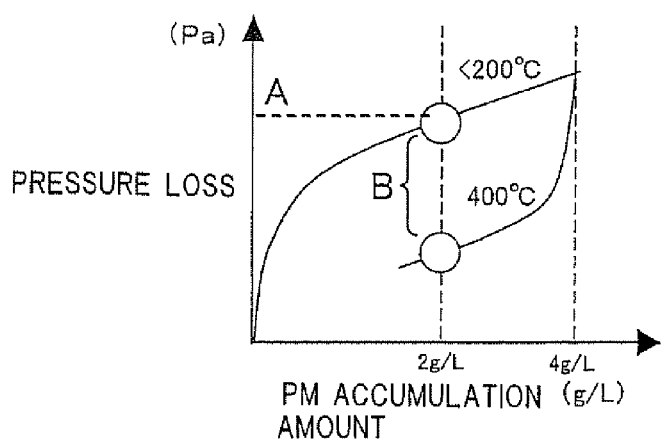
FIG. 6 is a view showing hysteresis characteristics of the second honeycomb filter constituting the honeycomb filter system of the present invention, which is a graph showing a correlation between pressure loss and PH accumulation amount per capacity.

[Hysteresis characteristics] FIG. 6 is a graph showing hysteresis characteristics of the second honeycomb filter, showing a correlation between pressure loss and PM accumulation amount per capacity. In the present Example, after 4 g/L of PM as a mass per capacity was accumulated on the second honeycomb filter at a temperature of 200° C., a part of PM was combusted at a temperature of 400° C. to obtain pressure loss when the amount of PM is reduced to 2 g/L (referred to as pressure loss C). The pressure loss difference B which is a difference between the pressure loss A and the pressure loss C was calculated to show a ratio of the pressure loss difference B to the pressure loss A. The ratio was regarded as hysteresis characteristics.

(Manufacture of honeycomb filter system) The first honeycomb filter and the second honeycomb filter obtained ahead were disposed in series in a stainless container having an inlet and an outlet for exhaust gas to obtain a honeycomb filter system. Incidentally, the first honeycomb filter had a columnar shape (cylindrical shape) having a diameter of 144 mm and a length of 152 mm.

(Evaluation of honeycomb filter system) The honeycomb filter system obtained above was evaluated for performance as a DPF system by pressure loss upon PM accumulation, PM purification efficiency, and PM accumulation residual volume after driving in a European regulation driving mode. The results are shown in Table 2 with a filter capacity, a cell density, a partition wall thickness, the mean pore diameter, a porosity, a material used for forming an oxidation catalyst layer and an amount thereof of the first filter, and a honeycomb filter number corresponding to Table 1 and a filter capacity of the second honeycomb filter. Incidentally, in Example 1, a catalyst was not supported on the second honeycomb filter. The filter capacity, mean pore diameter, pore distribution, and porosity were measured using Porosimeter 9810 produced by Shimadzu Corporation.

TABLE 2(a)

| | First honeycomb filter | | | | | | | |
|---|---|---|---|---|---|---|---|---|
| | | | Partition wall matrix | | | | | |
| | Filter capacity (liter) | Cell density (cells/cm²) | Thickness (μm) | Mean pore diameter (μm) | Porosity (%) | Catalyst | Amount of Pt (g/L) | Amount of alumina (g/L) |
| Example 1 | 1.5 | 46.5 | 300 | 38 | 65 | Pt + alumina | 2 | 30 |
| Example 2 | 1.5 | 31 | 200 | 68 | 45 | Pt + alumina | 2 | 30 |
| Example 3 | 1.5 | 46.5 | 300 | 38 | 65 | Pt + alumina | 2 | 30 |
| Comp. Ex. 1 | 4 | 46.5 | 300 | 25 | 60 | Pt + alumina | 3 | 50 |

TABLE 2(b)

| | Second honeycomb filter | | | | Pressure loss | PM purification efficiency (%) | PM accumulation residual volume after driving five times in European regulation driving mode (g) |
|---|---|---|---|---|---|---|---|
| | Honeycomb filter No. (Table 1) | Filter capacity (liter) | Catalyst | Amount of Pt (g/L) | upon PM accumulation (relative value) | | |
| Example 1 | No. 1 | 1.5 | None | None | 0.3 | 99 | 5 |
| Example 2 | No. 2 | 1.5 | Pt + alumina | 1 | 0.2 | 99 | 3 |
| Example 3 | No. 3 | 1.5 | Pt + alumina | 1 | 0.4 | 99 | 3 |
| Comp. Ex. 1 | — | — | — | — | 1 | 90 | 12 |

[Pressure loss upon PM accumulation] Air at 200° C. was flowed into a honeycomb filter system having PM accumulated at the rate of 2 g/L as a mass per capacity at a flow rate of 2.4 Nm³/min, and the difference in pressure between the inlet (upstream) and the outlet (downstream) of the honeycomb filter system was measured with a differential manometer to obtain the pressure loss upon PM accumulation. The pressure loss upon PM accumulation shown in Table 2 is a relative value regarding the result of Comparative Example 1 as 1.

[PM purification efficiency] Exhaust gas from a light oil burner was flowed into the honeycomb filter system under the conditions of flow rate of 2.4 Nm³/min, temperature of 350° C., and PM production rate of 1 g/hr. At the inlet and the outlet of the honeycomb filter system, the concentration of PM in exhaust gas was measured as the number of PM particles with a SMPS (Scanning Mobility Particle Sizer) produced by TSI Incorporated. Using a value obtained by converting the concentration to its equivalent in mass, a purification efficiency was obtained by the formula:

*PM* purification efficiency (%)={(*PM* mass concentration at the inlet of honeycomb filter system)−(*PM* mass concentration at the outlet of honeycomb filter system)}(*PM* mass concentration at the inlet of honeycomb filter system)×100.

[PM accumulation residual volume] A honeycomb filter system having the first honeycomb filter and the second honeycomb filter, neither having PM accumulation, was attached to an exhaust gas system of an automobile having a 2 liter diesel engine, and driving was performed five times on a chassis dynamometer on the basis of driving conditions in a European regulation driving mode. Then, the first honeycomb filters and the second honeycomb filter were taken out and measured for mass by an electronic balance after being dried at 200° C. for 10 hours. The PM accumulation volume remaining on both of the honeycomb filters after the above driving was measured depending on the difference between the mass measured above and the masses of the first honeycomb filter and the second honeycomb filter measured after being dried at 200° C. for 10 hours in advance before the test.

EXAMPLE 2

Upon manufacturing a plugged honeycomb structure for the first honeycomb filter, a die for extrusion forming was appropriately changed, and a particle size distribution and blending quantity of the cordierite-forming raw material and a particle size distribution and blending quantity of the pore former were appropriately adjusted to change the cell density, thickness of partition wall matrix, mean pore diameter, and porosity. Upon manufacturing a plugged honeycomb structure of the second honeycomb filter, a particle size distribution and blending quantity of the cordierite-forming raw material and a particle size distribution and blending quantity of the pore former were appropriately adjusted to change the mean pore diameter of the partition wall matrix and porosity of the partition wall matrix. In addition, upon forming the surface layer of the second honeycomb filter, the fibrous material was appropriately changed to change the peak pore diameter of the surface layer. Further, Pt was supported on the surface layer of the second honeycomb filter as a catalyst in a method according to a means for obtaining the first honeycomb filter (formation of an oxidation catalyst layer). Except for these, the first honeycomb filter, the second honeycomb filter, and the honeycomb filter system were manufactured in the same manner as in Example 1 to evaluate the second honeycomb filter independently and the honeycomb filter system for the same items as in Example 1. The results are shown in Tables 1 and 2. In addition, the Pt-carrying amount of the second honeycomb filter is shown in Table 2.

EXAMPLE 3

Upon manufacturing a plugged honeycomb structure for the second honeycomb filter, a particle size distribution and blending quantity of the cordierite-forming raw material and a particle size distribution and blending quantity of the pore former were appropriately adjusted to change the mean pore diameter of the partition wall matrix and porosity of the partition wall matrix. Upon forming the surface layer for the second honeycomb filter, the fibrous material was appropriately changed to change the peak pore diameter of the surface layer. In addition, Pt was supported on the surface layer of the second honeycomb filter as a catalyst in the same manner as in Example 2. Except for these, the first honeycomb filter, the second honeycomb filter, and the honeycomb filter system were manufactured in the same manner as in Example 1 to evaluate the second honeycomb filter independently and the honeycomb filter system for the same items as in Example 1. The results are shown in Tables 1 and 2. Also, the (supported) Pt amount of the second honeycomb filter is shown in Table 2.

COMPARATIVE EXAMPLE 1

Only one honeycomb filter (the first honeycomb filter) having an oxidation catalyst layer was evaluated for the same items as in Example 1 of the honeycomb filer system. The results are shown in Table 2. Incidentally, upon manufacturing a plugged honeycomb structure for this honeycomb filter, a particle size distribution and blending quantity of cordierite forming raw material and a particle size distribution and blending quantity of pore former were appropriately adjusted to change the filter capacity, the mean pore diameter of the partition wall matrix, and the porosity of the partition wall matrix. In addition, the Pt amount and the alumina amount contained in the oxidation catalyst layer were changed by adjusting the coating operation of slurry.

(Discussion) The results shown in Tables 1 and 2 show that, in the honeycomb filter systems of Examples 1 to 3, an oxidation catalyst containing platinum (Pt), ceria, and alumina is supported on the inner surfaces of the pores of the partition wall matrix of the first honeycomb filter with the partition wall matrix having a mean pore diameter of 25 µm or more and below 70 µm and a porosity of 40% or more and below 70%, the second honeycomb filter has a surface layer on one side of the partition wall matrix, the peak pore diameter of the surface layer is equivalent to or smaller than that of the partition wall matrix, the porosity of the surface layer is larger than that of the partition wall matrix, the surface layer has a peak pore diameter of 0.3 µm or more and below 20 µm and a porosity of 60% or more and below 95%, the thickness L1 of the surface layer is 0.5% or more and below 30% of the thickness L2 of the partition walls, the mass per filter area of the surface layer is 0.01 mg/cm$^2$ or more and below 6 mg/cm$^2$, and the partition wall matrix has a mean pore diameter of 10 µm or more and below 60 µm and a porosity of 40% or more and below 65%. Therefore, the honeycomb filter systems of Examples 1 to 3 have small pressure loss upon PM accumulation, excellent PM purification efficiency, and less residual volume of PM accumulation after driving in a European regulation driving mode is carried out.

On the other hand, a mode having only the first honeycomb filter of the Comparative Example 1 (mode of a conventional DPF) has a large filter capacity of its own, and it was confirmed that, in spite of high Pt and alumina amounts contained in the oxidation catalyst layer, the mode has large pressure loss upon PM accumulation, low PM purification efficiency, and large residual volume of PM accumulation after driving in a European regulation driving mode is carried out, in comparison with Examples 1 to 3.

A honeycomb filter system of the present invention can be used for removing particulate matter contained in exhaust gas discharged from internal combustion engines such as automobile engines, construction machinery engines, and industrial machinery stationary engines and other burning appliances.

What is claimed is:

1. A honeycomb filter system comprising a first honeycomb filter disposed upstream and a second honeycomb filter disposed downstream to be lined up in series;

wherein the first honeycomb filter is provided with a porous partition wall matrix partitioning and forming a plurality of cells functioning as fluid passages, predetermined cells each having an open end portion on one side and a plugged end portion on the other side and the remaining cells each having a plugged end portion on one side and an open end portion on the other side are alternately disposed, and the first honeycomb filter satisfies the conditions of (F1) and (F2), and the second honeycomb filter is provided with partition walls having a porous partition wall matrix partitioning and forming a plurality of cells functioning as fluid passages and a surface layer disposed on one side of the partition wall matrix, predetermined cells each having an open end portion on one side and a plugged end portion on the other side and the remaining cells each having a plugged end portion on one side and an open end portion on the other side are alternately disposed, and the second honeycomb filter satisfies the conditions of (R1) to (R5):

(F1) in the first honeycomb filter, the partition wall matrix has a mean pore diameter of 25 μm or more and below 70 μm and a porosity of 40% or more and below 70%, (F2) in the first honeycomb filter, an oxidation catalyst containing at least one material selected from the group consisting of platinum (Pt), palladium, ceria, and alumina is supported on a part or whole of the inner surfaces of the pores of the partition wall matrix, (R1) in the second honeycomb filter, the surface layer has a peak pore diameter equivalent to or smaller than that of the partition wall matrix and a porosity higher than that of the partition wall matrix, (R2) in the second honeycomb filter, the surface layer has a peak pore diameter of 0.3 μm or more and below 20 μm and a porosity of 60% or more and below 95% (measured by mercury intrusion technique), (R3) in the second honeycomb filter, thickness L1 of the surface layer is 0.5% or more and below 30% of thickness L2 of the partition wall, (R4) in the second honeycomb filter, a mass per filtration area of the surface layer is 0.01 mg/cm$^2$ or more and below 6 mg/cm$^2$, and (R5) in the second honeycomb filter, the partition wall matrix has a mean pore diameter of 10 μm or more and below 60 μm and a porosity of 40% or more and below 65%.

2. The honeycomb filter system according to claim 1, wherein, in the second honeycomb filter, the thickness L1 of the surface layer is smaller in the central portion than that in the portion near the one end portion and the other end portion in a distribution in a direction linking the one end portion and the other end portion.

3. The honeycomb filter system according to claim 1, wherein, the surface layer of the second honeycomb filter has a peak pore diameter of 6 μm or more and below 10 μm and a porosity of 80% or more and below 95%.

4. The honeycomb filter system according to claim 2, wherein, the surface layer of the second honeycomb filter has a peak pore diameter of 6 μm or more and below 10 μm and a porosity of 80% or more and below 95%.

5. The honeycomb filter system according to claim 1, wherein, in the second honeycomb filter, the thickness L1 of the surface layer is 3% or more and below 15% of the thickness L2 of the partition wall.

6. The honeycomb filter system according to claim 2, wherein, in the second honeycomb filter, the thickness L1 of the surface layer is 3% or more and below 15% of the thickness L2 of the partition wall.

7. The honeycomb filter system according to claim 1, wherein, in the second honeycomb filter, the partition wall matrix has a mean pore diameter of 40 μm or more and below 60 μm and a porosity of 40% or more and below 60%.

8. The honeycomb filter system according to claim 2, wherein, in the second honeycomb filter, the partition wall matrix has a mean pore diameter of 40 μm or more and below 60 μm and a porosity of 40% or more and below 60%.

9. The honeycomb filter system according to claim 3, wherein, in the second honeycomb filter, the partition wall matrix has a mean pore diameter of 40 μm or more and below 60 μm and a porosity of 40% or more and below 60%.

10. The honeycomb filter system according to claim 4, wherein, in the second honeycomb filter, the partition wall matrix has a mean pore diameter of 40 μm or more and below 60 μm and a porosity of 40% or more and below 60%.

11. The honeycomb filter system according to claim 1, wherein, in the second honeycomb filter, the partition wall matrix is constituted of at least one material selected from the group consisting of cordierite, Si-bonded SiC, recrystallized SiC, alumina titanate, mullite, silicon nitride, sialon, zirconium phosphate, zirconia, titania, alumina, and silica as a main component.

12. The honeycomb filter system according to claim 2, wherein, in the second honeycomb filter, the partition wall matrix is constituted of at least one material selected from the group consisting of cordierite, Si-bonded SiC, recrystallized SiC, alumina titanate, mullite, silicon nitride, sialon, zirconium phosphate, zirconia, titania, alumina, and silica as a main component.

13. The honeycomb filter system according to claim 3, wherein, in the second honeycomb filter, the partition wall matrix is constituted of at least one material selected from the group consisting of cordierite, Si-bonded SiC, recrystallized SiC, alumina titanate, mullite, silicon nitride, sialon, zirconium phosphate, zirconia, titania, alumina, and silica as a main component.

14. A honeycomb filter system according to claim 1, wherein, in the second honeycomb filter, the surface layer contains ceramic or metal fibers in an amount of 70% by mass or more.

15. A honeycomb filter system according to claim 2, wherein, in the second honeycomb filter, the surface layer contains ceramic or metal fibers in an amount of 70% by mass or more.

16. The honeycomb filter system according to claim 14, wherein, in the second honeycomb filter, the fibers are constituted of at least one material selected from the group consisting of aluminosilicate, alumina, silica, zirconia, ceria, and mullite as a main component.

17. A honeycomb filter system according to claim 16, wherein, in the second honeycomb filter, the fibers have a mean diameter of 0.5 μm or more and below 8 μm and a mean length of 100 μm or more and below 500 μm.

18. The honeycomb filter system according to claim 16, wherein, in the second honeycomb filter, the fibers are biosoluble fibers.

19. The honeycomb filter system according to claim 17, wherein, in the second honeycomb filter, the fibers are biosoluble fibers.

20. The honeycomb filter system according to claim 1, wherein a catalyst containing one of or both platinum (Pt) and palladium is(are) supported on the surface layer of the second honeycomb filter.

* * * * *